(12) United States Patent
Monereau et al.

(10) Patent No.: US 7,628,843 B2
(45) Date of Patent: Dec. 8, 2009

(54) ADSORPTION METHOD FOR PRODUCING HYDROGEN AND DEVICE FOR CARRYING OUT SAID METHOD

(75) Inventors: Christian Monereau, Paris (FR); François Fuentes, Le Vesinet (FR); Guillaume De Souza, Issy les Moulineaux (FR)

(73) Assignee: L'Air Liquide, Societe Anonyme A Directoire Et Conseil de Surveillance pour l'Etude Et l'Exploitation des Procedes Georges Claude, Paris (FR)

( * ) Notice: Subject to any disclaimer, the term of this patent is extended or adjusted under 35 U.S.C. 154(b) by 570 days.

(21) Appl. No.: 10/562,603

(22) PCT Filed: Jun. 28, 2004

(86) PCT No.: PCT/FR2004/050294

§ 371 (c)(1),
(2), (4) Date: Dec. 28, 2005

(87) PCT Pub. No.: WO2005/009591

PCT Pub. Date: Feb. 3, 2005

(65) Prior Publication Data

US 2006/0156921 A1 Jul. 20, 2006

(30) Foreign Application Priority Data

Jul. 24, 2003 (FR) ................................. 03 50368

(51) Int. Cl.
*B01D 53/047* (2006.01)
(52) U.S. Cl. ............................................ 95/96; 95/143
(58) Field of Classification Search .................. 96/121, 96/130; 95/96, 143
See application file for complete search history.

(56) References Cited

U.S. PATENT DOCUMENTS

| 4,836,833 A | 6/1989 | Nicholas et al. |
| 5,435,836 A | 7/1995 | Anand et al. |
| 7,252,702 B2 * | 8/2007 | Al-Babtain .................... 95/96 |

FOREIGN PATENT DOCUMENTS

EP 0 579 290 1/1994

OTHER PUBLICATIONS

International Search Report for PCT/FR2004/050294, Oct. 19, 2004.

* cited by examiner

*Primary Examiner*—Robert A Hopkins
(74) *Attorney, Agent, or Firm*—Elwood Leonard Haynes

(57) ABSTRACT

A feedstock hydrogen-enriched gas (3) is supplied to a PSA purification unit (1) which delivers pure hydrogen at a production output (4) and a hydrogen-deficient gas at a residual output. Said hydrogen-deficient gas is compressed (9) and injected into a line (10) wherein a gaseous combustible mixture circulates whose part (12) is extracted upstream of the PSA unit (1), compressed (13) and reinjected into said feedstock of the PSA unit (1). Said invention is used, in particular for petrochemical sites.

11 Claims, 1 Drawing Sheet

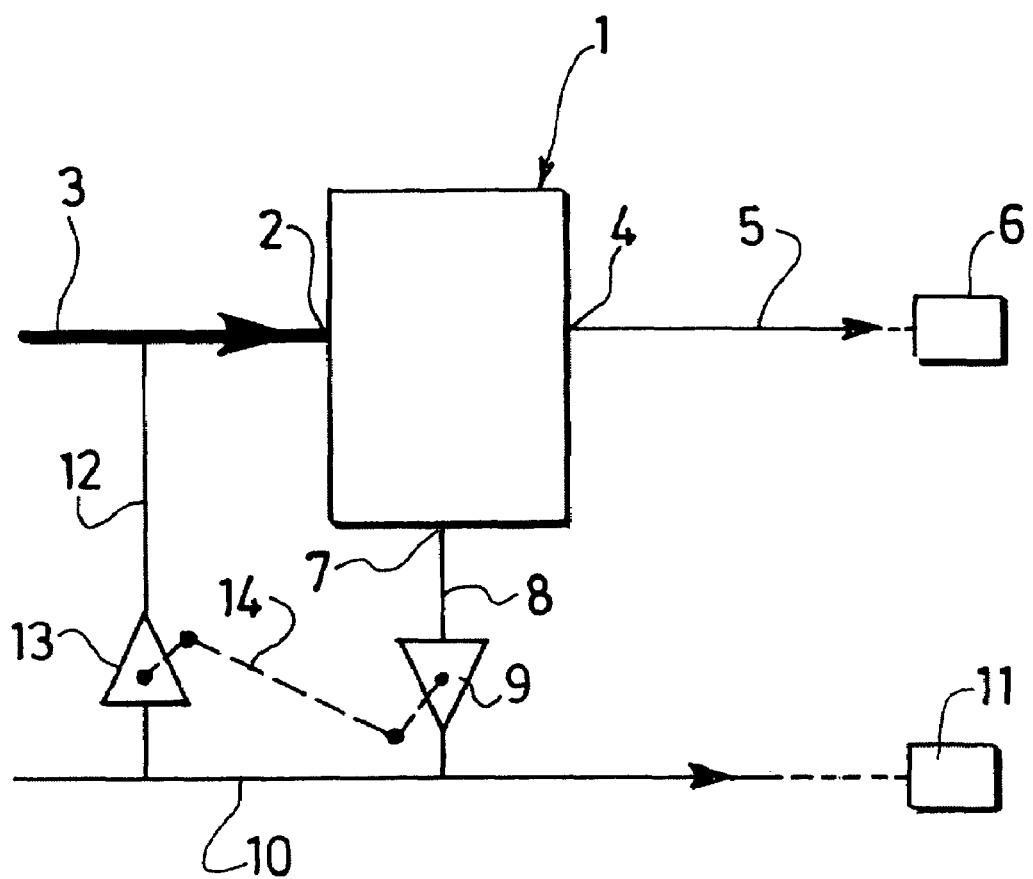

ADSORPTION METHOD FOR PRODUCING HYDROGEN AND DEVICE FOR CARRYING OUT SAID METHOD

The present invention relates to the methods for producing/purifying hydrogen by Pressure Swing Adsorption in a PSA unit of a feedstock gas at a first pressure containing hydrogen, with compressed waste being sent to a fuel gas mixture distribution network at a second pressure and also containing hydrogen and intended to supply various user stations on the site or nearby.

In conventional installations for the production of hydrogen from a feedstock gas, the hydrogen is produced, give or take pressure drops, at the high pressure of the feedstock gas, the waste from the PSA for its part generally being discharged at low pressure into a fuel gas mixture distribution network (known as the fuel gas network) present on large industrial sites and carrying medium-pressure hydrogen and hydrocarbon mixtures originating from various blowdowns and intended to be burnt, particularly in a boiler, to produce steam.

These PSA units have the defect of being limited in their extraction efficiency, which means that a not insignificant proportion of the hydrogen from the feedstock gas is lost in the waste and in the fuel gas mixture network.

In order to progress from an efficiency slightly in excess of 72% to an efficiency slightly in excess of 80%, it has been proposed that the equalizing between the cylinders of the PSA unit be proliferated, something which nonetheless entails a great deal of investment (a larger number of absorbers, which are generally larger individually).

A second approach toward improving the efficiency is to reduce the regeneration pressure by extracting the waste at a reduced pressure slightly higher than atmospheric pressure, it then being possible for the efficiency, at the expense of the addition of a compressor, to reach values of the order of 90%.

Furthermore, by recirculating, with compression, some of the PSA waste in the feedstock gas, it is possible to achieve efficiencies of the order of 95%, but at the expense of an additional compressor.

It is an object of the present invention to propose an improved method for producing hydrogen that makes it possible, without significant on-cost, to obtain efficiencies in excess of 95%, attaining or even exceeding 100%.

In order to do this, the method according to the invention further comprises the step of tapping off a fraction of the fuel gas mixture from the distribution network, of compressing it more or less to the pressure of the feedstock gas and of injecting it by way of additional feedstock gas into the PSA unit, for example mixed in with the feedstock gas.

The reasoning behind this is as follows: whereas, even with a hydrogen-rich feedstock gas, for example one having a hydrogen content in excess of 70%, the composition of the waste rapidly becomes lean when the efficiency of the PSA unit is increased, soon dropping below 30% when the extraction efficiencies exceed 85%, the inventors have demonstrated that, in most cases, the hydrogen content in the fuel gas mixture distribution network was above these values, generally of the order of 35 to 50%, and that it was therefore sensible to form a secondary feed to the PSA unit using this hydrogen-rich fluid rather than using recirculated waste.

Using the method according to the invention, for the same production, it will be necessary to introduce less feedstock gas, thus reducing the compression required and generally the size of the PSA unit for a saving in terms of energy and in terms of investment. It also becomes possible, for the same level of impurities introduced into the PSA unit and/or for the same quantity of compressed gas, to process appreciably more hydrogen and increase production in order, as mentioned hereinabove, to achieve efficiencies in excess of 98%.

The use of multiple beds employing different adsorbents with specific functionalities, such as activated alumina, silica gels, activated carbons and appropriate zeolites, allows precise control over the introduction into the PSAs of undesirable components normally not present in the main feedstock gas.

Another subject of the present invention is an installation for implementing this method, comprising:

at least one feedstock gas supply pipe;
at least one line of a fuel gas mixture distribution network;
at least one PSA unit for separating gases by adsorption having one inlet connected to the feedstock gas pipe, a production gas outlet and at least one waste gas outlet;
a first compressor connecting the waste gas outlet to the fuel gas mixture line; and
a second compressor connecting the compressible gas mixture line to the inlet of the PSA unit, typically to the feedstock gas pipe.

According to a more specific feature of the invention, the first and second compressors use common compression stages on a common drive line. subassemblies and for example constitute different With such an arrangement, the addition of the secondary feed to the PSA unit which is obtained by compressing a fraction tapped off the fuel gas mixture distribution network makes it possible, for the better by comparison with a conventional solution, to increase the hydrogen extraction efficiency and to do so more effectively than can be achieved by recirculating some of the PSA unit waste.

The present invention will now be described in conjunction with an embodiment given by way of non-limiting illustration, with reference to the attached drawing in which:

FIG. 1 is a schematic view of an installation for implementing the method according to the invention.

The single FIGURE shows a PSA unit for producing hydrogen by pressure swing adsorption 1 comprising at least four adsorbers each containing at least one adsorbent capable of separating hydrogen from a gaseous mixture containing hydrogen, typically an active carbon and/or a zeolite.

The PSA unit 1 comprises an inlet 2 receiving a feedstock gas at high pressure, typically between 15 and 45 bar, in a pipe 3 leading for example from a catalytic reforming unit and containing at least 60%, advantageously at least 70%, hydrogen. The PSA unit 1 comprises an outlet 4 feeding into a supply pipe 5, more or less at the same pressure as the feedstock gas, supplying high-purity hydrogen to user stations 6 on the site.

The PSA unit 1 comprises at least one waste gas outlet 7, impoverished in hydrogen, leading, via a pipe 8 incorporating an extraction compressor 9, to a line 10 conveying, on the site, a fuel gas mixture intended to be fed to other user stations, typically burners 11 for heating active or passive parts of the industrial site and containing at least 30%, and advantageously between 35 and 50%, hydrogen.

Using this arrangement, the waste gas is extracted, at the outlet 7, at a low pressure, of the order of 1.1 to 2 bar, and is compressed, by the compressor 9, to the pressure obtaining in the line 10, typically ranging between 3 and 8 bar.

According to one aspect of the invention, a pipe 12 incorporating a compressor 13 connects a point of the line 10 upstream of the region of connection of the line 10 to the pipe 8 to the feedstock gas supply pipe 3, the compressor 13 raising the fraction of the stream of fuel gas mixture tapped from the line 10 to the high pressure of the pipe 3 in order to reinject an additional quantity of hydrogen available in the fuel gas mixture into the feedstock gas.

According to one aspect of the invention, the compressors 9 and 13 are arranged in such a way as to share certain subassemblies, for example a common oil system, a common cooling system, or even a common drive system, as embodied by the line 14 in the FIGURE.

Thus, for preference, the two compressors 9 and 13 are combined into a single machine with one or several stages devoted to each of the compressors, it being possible for said stages to be pistons, impellers, screws.

By thus integrating functionalities of the two compressors it is possible to make economies of scale of the order of 30 to 40% on the investment.

Although the invention has been described in conjunction with some particular embodiments, it is not restricted thereto but can be modified and varied in ways which will be evident to the person skilled in the art within the scope of the claims that follow.

Thus the injection of part of the stream of fuel gas mixture into the PSA unit 1 via the pipe 12 may be performed separately from the admission of main feedstock gas 3 into the PSA unit 1 if the cycle adopted for the latter so permits (particularly in the case of several cylinders simultaneously in the production phase).

Furthermore, also depending on the cycles of the PSA unit 1, it is possible to inject a fraction of the waste available at the outlet 7 of the PSA unit 1 directly into the network 10, without compression, for example at the start of the depressurization of an absorber, the waste then being compressed by the compressor when the pressure in the absorber cylinder decreases.

Finally, a stream of fuel gas mixture may be tapped from a network operating in parallel with the network 10 receiving the waste from the PSA unit, provided that this parallel network is carrying a gaseous mixture containing at least 30% hydrogen.

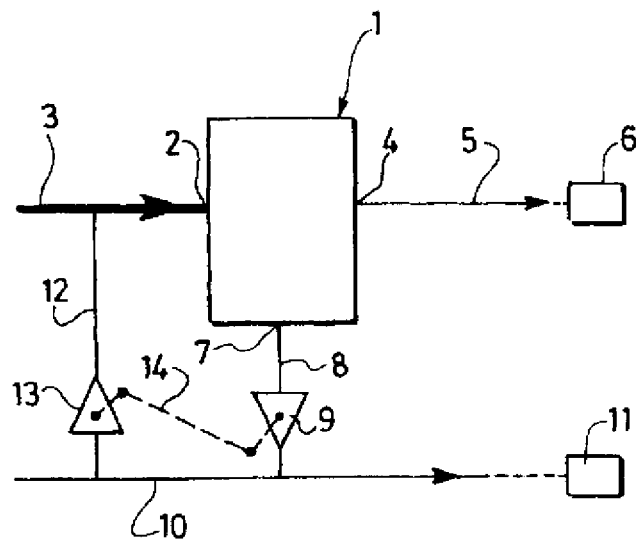

The invention claimed is:

1. A method for producing hydrogen by Pressure Swing Adsorption in a PSA unit, comprising;
   introducing a feedstock gas containing hydrogen into said PSA unit at a first pressure, wherein said PSA unit produces a waste gas stream,
   compressing said waste gas stream to a second pressure, in a first compressor, thereby producing a compressed waste gas stream, wherein said second pressure is lower than said first pressure,
   introducing said compressed waste gas stream into a fuel gas mixture distribution network, wherein said fuel gas mixture distribution network contains a fuel gas mixture comprising hydrogen, thereby producing a blended stream;
   removing a portion of said blended stream from said fuel gas mixture distribution network,
   compressing said blended stream portion to a third pressure, in a second compressor, thereby producing a compressed blended stream portion, wherein said third pressure is equal to or greater than said first pressure, and
   introducing said compressed blended stream portion into said PSA unit.

2. The method of claim 1, further comprising introducing said compressed blended stream portion into said feedstock gas, prior to introduction into said PSA unit.

3. The method of claim 1, wherein said first pressure is between about 15 and 45 bar and wherein said second pressure is between about 3 and 8 bar.

4. The method of claim 1, wherein said waste gas stream is extracted from the pressure swing adsorption unit at a fourth pressure, and wherein said fourth pressure is between about 1.1 and 2 bar.

5. The method of claim 1, wherein said fuel gas mixture contains at least about 30% hydrogen.

6. The method of claim 1, wherein said fuel gas mixture contains between about 35 and 50% hydrogen.

7. An installation for implementing the method of claim 1, comprising:
   a) at least one feedstock gas supply pipe;
   b) at least one line of a fuel gas mixture distribution network;
   c) at least one PSA unit for separating gases by adsorption having one inlet connected to the feedstock gas pipe, a production gas outlet and at least one waste gas outlet;
   d) said first compressor connecting said waste gas outlet to said fuel gas mixture distribution network line; and
   e) said second compressor connecting said fuel gas mixture distribution network line to said inlet of the PSA unit.

8. The installation of claim 7, wherein said second compressor is placed in a pipe connecting said fuel gas mixture distribution network line to the feedstock gas pipe.

9. The installation of claim 7, wherein said second compressor is connected to said fuel gas mixture distribution network line upstream of said fuel gas mixture distribution network connection to the first compressor.

10. An installation for implementing the method of claim 1, comprising:
    a) at least one feedstock gas supply pipe;
    b) at least one line of a fuel gas mixture distribution network;
    c) at least on PSA unit fir separating gases by adsorption having one inlet connected to the feedstock gas pipe, a production gas outlet and at least one waste gas outlet;
    d) said first compressor connecting said waste gas outlet to said fuel gas mixture distribution network line; and
    e) said second compressor connecting said fuel gas mixture distribution network line to said inlet of the PSA unit,
    wherein said first and said second compressors use common subassemblies.

11. The installation of claim 10, wherein said first and said second compressors have a common driveline.

* * * * *

UNITED STATES PATENT AND TRADEMARK OFFICE
CERTIFICATE OF CORRECTION

PATENT NO. : 7,628,843 B2  Page 1 of 1
APPLICATION NO. : 10/562603
DATED : December 8, 2009
INVENTOR(S) : C. Monereau et al.

It is certified that error appears in the above-identified patent and that said Letters Patent is hereby corrected as shown below:

In Column 4, delete claims 7 through 9.

In Column 4, line 43, replace the word "fir" with the word --for--.

In Column 4, line 52, replace the words "claim 10" with the words --claim 7--.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

PATENT NO.       : 7,628,843 B2
APPLICATION NO.  : 10/562603
DATED            : December 8, 2009
INVENTOR(S)      : C. Monereau et al.

It is certified that error appears in the above-identified patent and that said Letters Patent is hereby corrected as shown below:

Delete the title page and substitute therefore the attached title page showing the corrected number of claims in patent.

In Column 4, lines 11-38, delete claims 7 through 9.

In Column 4, line 43, replace the word "fir" with the word --for--.

In Column 4, line 52, replace the words "claim 10" with the words --claim 7--.

This certificate supersedes the Certificate of Correction issued April 10, 2012.

Signed and Sealed this
First Day of May, 2012

David J. Kappos
*Director of the United States Patent and Trademark Office*

United States Patent
Monereau et al.

(10) Patent No.: US 7,628,843 B2
(45) Date of Patent: Dec. 8, 2009

(54) ADSORPTION METHOD FOR PRODUCING HYDROGEN AND DEVICE FOR CARRYING OUT SAID METHOD

(75) Inventors: Christian Monereau, Paris (FR); François Fuentes, Le Vesinet (FR); Guillaume De Souza, Issy les Moulineaux (FR)

(73) Assignee: L'Air Liquide, Societe Anonyme A Directoire Et Conseil de Surveillance pour l'Etude Et l'Exploitation des Procedes Georges Claude, Paris (FR)

(*) Notice: Subject to any disclaimer, the term of this patent is extended or adjusted under 35 U.S.C. 154(b) by 570 days.

(21) Appl. No.: 10/562,603

(22) PCT Filed: Jun. 28, 2004

(86) PCT No.: PCT/FR2004/050294
§ 371 (c)(1),
(2), (4) Date: Dec. 28, 2005

(87) PCT Pub. No.: WO2005/009591
PCT Pub. Date: Feb. 3, 2005

(65) Prior Publication Data
US 2006/0156921 A1 Jul. 20, 2006

(30) Foreign Application Priority Data
Jul. 24, 2003 (FR) .................... 03 50368

(51) Int. Cl.
*B01D 53/047* (2006.01)
(52) U.S. Cl. ............................. 95/96; 95/143
(58) Field of Classification Search ............. 96/121, 96/130; 95/96, 143
See application file for complete search history.

(56) References Cited

U.S. PATENT DOCUMENTS

| 4,836,833 A | 6/1989 | Nicholas et al. |
| 5,435,836 A | 7/1995 | Anand et al. |
| 7,252,702 B2 * | 8/2007 | Al-Babtain ............... 95/96 |

FOREIGN PATENT DOCUMENTS

EP 0 579 290 1/1994

OTHER PUBLICATIONS

International Search Report for PCT/FR2004/050294, Oct. 19, 2004.

* cited by examiner

Primary Examiner—Robert A Hopkins
(74) Attorney, Agent, or Firm—Elwood Leonard Haynes

(57) ABSTRACT

A feedstock hydrogen-enriched gas (3) is supplied to a PSA purification unit (1) which delivers pure hydrogen at a production output (4) and a hydrogen-deficient gas at a residual output. Said hydrogen-deficient gas is compressed (9) and injected into a line (10) wherein a gaseous combustible mixture circulates whose part (12) is extracted upstream of the PSA unit (1), compressed (13) and reinjected into said feedstock of the PSA unit (1). Said invention is used, in particular, for petrochemical sites.

8 Claims, 1 Drawing Sheet